(12) United States Patent
Reed et al.

(10) Patent No.: US 8,447,940 B2
(45) Date of Patent: May 21, 2013

(54) BACKUP COPY ENHANCEMENTS TO REDUCE PRIMARY VERSION ACCESS

(75) Inventors: David Charles Reed, Tucson, AZ (US); Max Douglas Smith, Tucson, AZ (US); Thaiese Nicole Trader, Tucson, AZ (US); Robin Lea Ursery, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 12/114,188

(22) Filed: May 2, 2008

(65) Prior Publication Data

US 2009/0276592 A1 Nov. 5, 2009

(51) Int. Cl.
*G06F 13/00* (2006.01)
*G06F 13/28* (2006.01)

(52) U.S. Cl.
USPC ............................ 711/162; 707/641; 707/645

(58) Field of Classification Search .................. 711/162, 711/E12.103; 707/641, 645
See application file for complete search history.

(56) References Cited

U.S. PATENT DOCUMENTS

| 5,522,037 | A | * | 5/1996 | Kitagawa et al. | ............... 714/40 |
| 6,226,759 | B1 | | 5/2001 | Miller et al. | |
| 6,266,781 | B1 | | 7/2001 | Chung et al. | |
| 6,959,368 | B1 | | 10/2005 | St. Pierre et al. | |
| 7,206,911 | B2 | | 4/2007 | Wolfgang et al. | |
| 7,299,376 | B2 | | 11/2007 | Kodi et al. | |
| 2002/0059505 | A1 | * | 5/2002 | St. Pierre et al. | ............. 711/162 |
| 2004/0167972 | A1 | | 8/2004 | Demmon | |
| 2006/0059384 | A1 | * | 3/2006 | Helliker | .......................... 714/13 |
| 2006/0064444 | A1 | * | 3/2006 | van Ingen et al. | ............ 707/204 |
| 2006/0085672 | A1 | | 4/2006 | Watanabe et al. | |
| 2008/0059736 | A1 | * | 3/2008 | Murayama et al. | ........... 711/162 |

* cited by examiner

*Primary Examiner* — Edward Dudek, Jr.
(74) *Attorney, Agent, or Firm* — Griffiths & Seaton PLLC

(57) ABSTRACT

A method, system, and computer program product for performing a backup operation in a computing environment is provided. A dataset corresponding to a backup copy is examined to determine if the dataset has changed from a previous backup operation. If the dataset has not changed, a backup inventory registry is consulted to determine a current version of a backup copy. The current version is one of a plurality of available versions. The backup operation is performed using the current version of the backup copy.

20 Claims, 2 Drawing Sheets

BACKUP COPY ENHANCEMENTS TO REDUCE PRIMARY VERSION ACCESS

BACKGROUND OF THE INVENTION

1. Field of the Invention

The present invention relates in general to computers, and more particularly to apparatus, method and computer program product embodiments for implementing backup copy enhancements to reduce primary version access in a computing environment.

2. Description of the Related Art

Computers and computer systems are found in a variety of settings in today's society. Computing environments and networks may be found at home, at work, at school, in government, and in other settings. In many computer systems, an operating system (OS) helps to share computer resources (processor, memory, disk space, network bandwidth, etc.) between users and application programs. Operating systems may also control access to the computer system in a security-related function.

Generally, computing environments known as servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. Operating systems may be used, along with storage-specific applications, to facilitate the data storage.

SUMMARY OF THE INVENTION

Customers today create multiple copies of their data for backup/disaster recovery purposes. In many cases, these backups are made from the primary version of the dataset on a direct access storage device (DASD) such as a hard disk drive (HDD) or a redundant array of independent disks (RAID). However, in order to perform such a backup operation, the applicable DASD is typically in use and must be, in many cases, taken offline for the dataset to be retrieved. In situations where thousands of datasets are backed up at a single occurrence, the applicable DASD may be taken offline for an excessive time period.

In light of the foregoing, a need exists for a mechanism to allow for backup copies to be performed from a variety of sources other than the original dataset on the DASD, such as an existing backup version. Accordingly, this mechanism would reduce the amount of input/output (I/O) to the primary DASD and reduce enqueue contention to the primary version of the dataset.

In one embodiment, by way of example only, a method for performing a backup operation in a computing environment is provided. A dataset corresponding to a backup copy is examined to determine if the dataset has changed since a previous backup operation. If the dataset has not changed, a backup inventory registry is consulted to determine a current version of a backup copy. The current version is one of a plurality of available versions. The backup operation is then performed using the current version of the backup copy.

In another embodiment, again by way of example only, a system for performing a backup operation in a computing environment is provided. A backup module is operable on the computing environment. The backup module is configured for determining if a dataset corresponding to a backup copy has changed since a previous backup operation. If the dataset has not changed, the backup module is further configured for consulting a backup inventory registry to determine a current version of a backup copy. The current version is one of a plurality of available versions. The backup module is further configured to perform the backup operation using the current version of the backup copy.

In still another embodiment, again by way of example only, a computer program product for performing a backup operation in a computing environment is provided. The computer program product comprises a computer-readable storage medium having computer-readable program code portions stored therein. The computer-readable program code portions include a first executable portion for determining of a dataset corresponding to a backup copy has changed since a previous backup operation. If the dataset has not changed, a backup inventory registry is consulted to determine a current version of a backup copy, the current version one of a plurality of available versions. The backup operation is then performed using the current version of the backup copy.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for performing an enhanced backup operation in a computing environment. The enhanced operation reduces and/or eliminates access to the primary version/volume (e.g., DASD), freeing up the primary version to operate with less offline time. Exemplary embodiments include the use of a backup inventory registry that can be adapted to chronicle the history of backup versions of datasets in various locations, so that the backup operation mechanism can use existing backup versions in the most current state (e.g., most current location, most current date, and/or most current time) to perform the backup operations, rather than access the original dataset on the primary version, so long as the dataset on the primary version has not changed since the previous backup operation.

In addition to recording the current location of a particular backup copy, the backup inventory registry may be adapted to record the date and time that the particular backup copy was made. When a new backup version of the backup copy's dataset is to be made, the volume table of contents (VTOC) on the primary version may be consulted to determine of a dataset changed indicator bit is active. The indicator may be reset every time the primary version's dataset is backed up and made active whenever the dataset is opened for update and changed.

The mechanisms of the present invention are useful in aggregate backup operations, where a large number of datasets are backed up. Such aggregate backups may hold a variety of data, such as data relating to a particular application, a user id, and the like. Using the below mechanisms, the aggregate backups may take into account whether the current backup version is still valid. If the backup version is still valid, a copy of the backup version is made, rather than the host version (primary version) to reduce workload and contention on the host.

Figure 1:
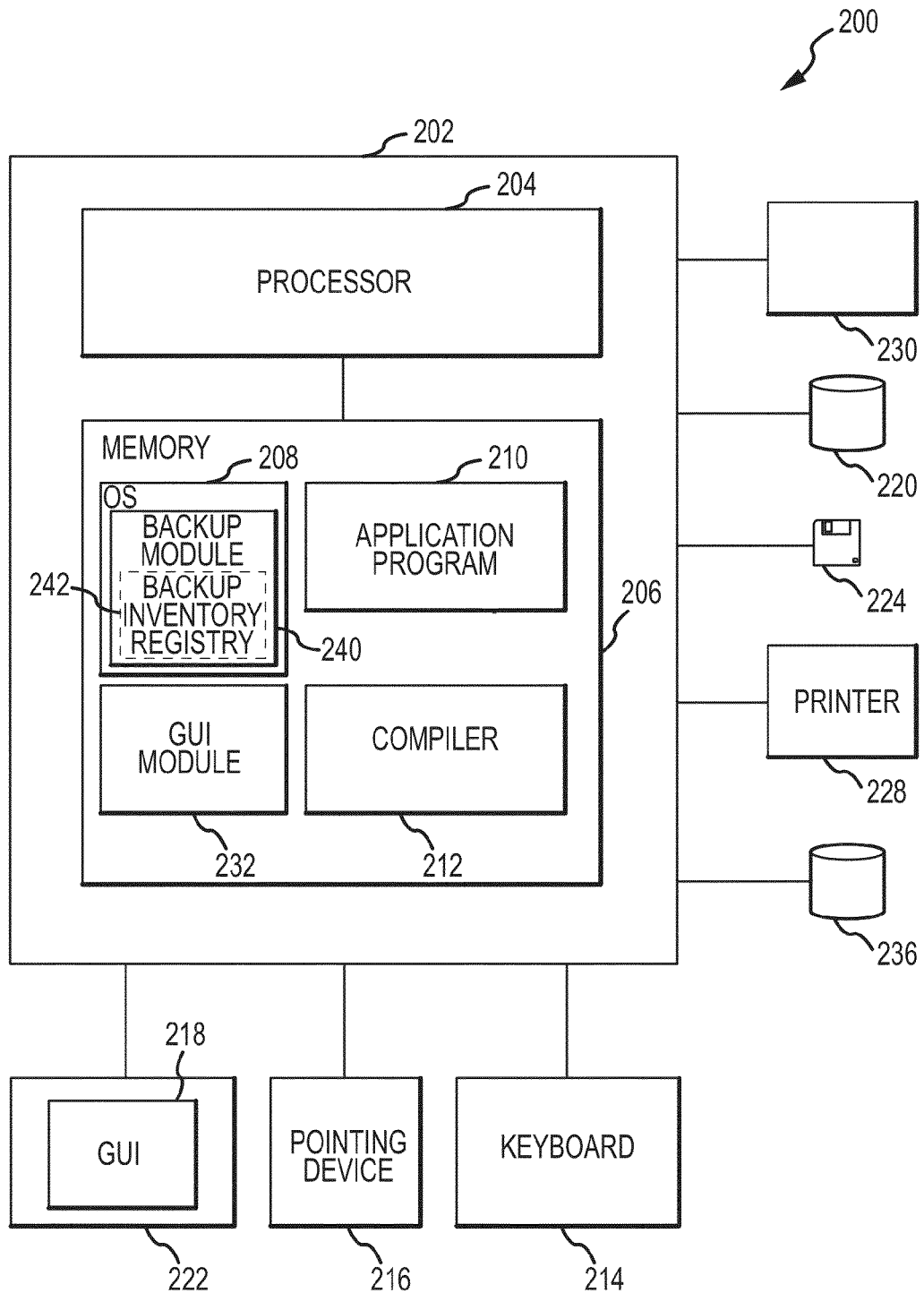
FIG. 1 illustrates an exemplary computing environment in which aspects of the present invention may be implemented.

FIG. 1 hereafter provides an example of computer environment in which the mechanisms of the following embodiments may be implemented. It should be appreciated, however, that FIG. 1 is only exemplary and is not intended to state or imply any limitation as to the particular architectures in which the exemplary aspects of the various embodiments may be implemented. Many modifications to the architecture depicted in FIG. 1 may be made without departing from the scope and spirit of the following description and claimed subject matter.

FIG. 1 illustrates an exemplary computer environment 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the backup mechanisms are facilitated by the OS 208. Although the GUI module 232 is depicted as a separate module, the instructions performing the GUI functions can be resident or distributed in the operating system 208, the computer program 210, or implemented with special purpose memory and processors. The computer 202 also implements a compiler 212 which allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, ethernet card, wireless link or other device for communicating with other computers, e.g. via the Internet or other network.

Data storage device 220 is a direct access storage device (DASD) 220, including one or more primary volumes holding a number of datasets. DASD 220 may include a number of storage media, such as hard disk drives (HDDs), tapes, and the like. Data storage device 236 may also include a number of storage media in similar fashion to device 220. The device 236 may be designated as a backup device 236 for holding backup versions of the number of datasets primarily stored on the device 220. As the skilled artisan will appreciate, devices 220 and 236 need not be located on the same machine. Devices 220 may be located in geographically different regions, and connected by a network link such as Ethernet. Devices 220 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, disc 224, hard drive, DVD/CD-ROM, digital tape, etc., which are generically represented as the disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). The program 210 may operate within a single computer 202 or as part of a distributed computer system comprising a network of computing devices. The network may encompass one or more computers connected via a local area network and/or Internet connection (which may be public or secure, e.g. through a VPN connection), or via a fibre channel Storage Area Network or other known network types as will be understood by those skilled in the art. (Note that a fibre channel SAN is typically used only for computers to communicate with storage systems, and not with each other.)

Operating system 208 includes a backup module 240. The backup module may operate in conjunction with program(s) 210, and other components within the computer environment 200, to implement backup operations on the environment 200. In one embodiment, the backup module 240 is adapted to perform various methodologies that will be further described, such as logging entries in a backup inventory registry 242, and consulting the VTOC. As one skilled in the art will appreciate, however, various additional components of the environment 200 may work individually or in concert to define, initialize, and perform the backup functionality as will be further described.

In general, and in accordance with the present invention, backup operations may be enhanced with various changes. The changes may be implemented automatically without the necessity of user interaction with the environment 200. The changes will be described in additional detail. In general, however, the changes may include consulting the backup inventory registry 242 and reviewing a number of backup entries for the most current backup copy (with its corresponding location), determining if a dataset corresponding to the backup copy has changed (e.g., consulting the dataset changed indicator on the VTOC), and depending if the dataset is changed, using the most current existing backup copy dataset to perform the additional backup, or using the original dataset from the primary version. Once the dataset is backed up, an entry of the backup is recorded (including location, date, and time) as an entry in the backup inventory registry 242.

Figure 2:
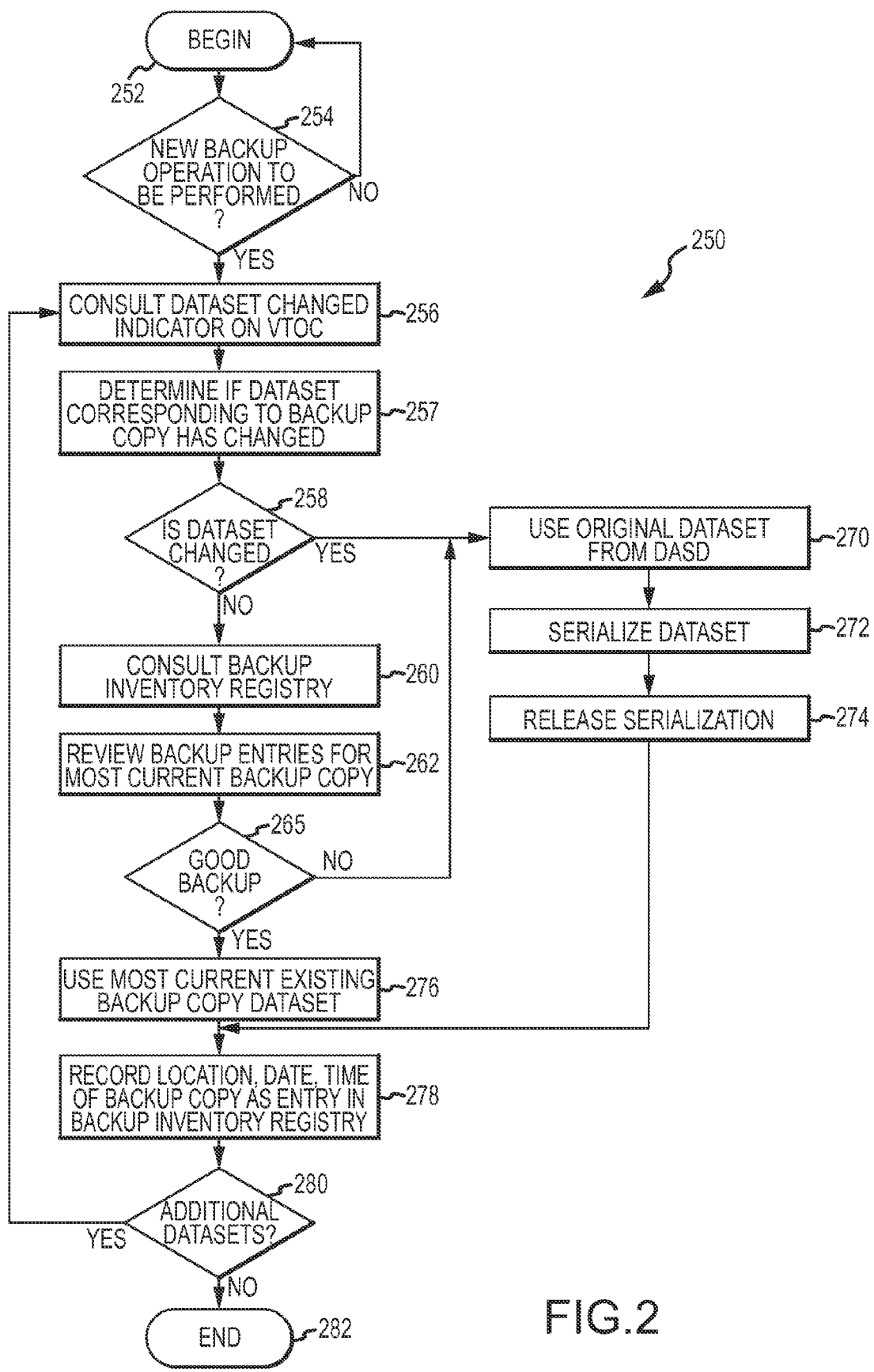
FIG. 2 illustrates an exemplary method for performing a backup operation in a computing environment.

Turning to FIG. 2, an exemplary method 250 is depicted for performing a backup operation using the mechanisms of the present invention in a computing environment. As one skilled in the art will appreciate, various steps in the method 250 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 250 begins (step 252) by determining that a backup operation is to be performed (step 254) for a particular dataset. As a next step, the dataset changed indicator on the primary version's VTOC (step 256) is consulted in one exemplary technique for determining if the dataset corresponding to the backup copy dataset has changed (step 257). If a determination is made that the dataset has changed (step 258), the method 250 uses the original backup version for the dataset on the primary version DASD (step 270). The dataset is serialized and the DASD is briefly taken offline (step 272). The serialization is released (step 274), and the DASD is again free to operate. Since the backup operation only serializes datasets which are changed, the DASD again operates without contention, and the method 250 can continue to perform backup operations on additional datasets without disturbing the primary version.

If it is determined that the dataset has not changed (again, step 258), the backup inventory registry is consulted (step 260). The consulting step may include reviewing backup entries (location, date, time), to identify the most current backup copy, as well as its present location (step 262). The method determines if the most current backup copy is good in order to perform the backup copy operation (step 265). If no, the method again uses the original dataset from DASD (step 270).

If the most current backup copy is good (again, step 265), then the method 250 uses the most current (e.g., current location, current date, current time) existing backup copy dataset to perform the backup operation (step 276) and the primary version is not disturbed.

Whether the original dataset is used or the most current backup copy is used, once the backup operation is complete for the dataset, an entry is recorded in the backup inventory registry as to the location, the time, and the date the backup version was made (step 278). Accordingly, if a changed dataset is backed up from the primary version (e.g., steps 270, 272, 274), but the dataset does not change between backup operations, the dataset stored on the backup version may be used in a subsequent iteration as its entry is recorded in the backup inventory registry in step 278.

The backup operations continue for each dataset. For example, as previously described, in aggregate backups perhaps several thousands of datasets may be backed up at a single instance. If the method 250 determines that a backup operation is to be performed for an additional dataset (step 280), then the method returns to step 256, where the backup inventory registry is consulted for the additional dataset. Once the backup operations are completed and the method 250 determines that no additional datasets are necessary to be backed up (again, step 280), then the method 250 ends (step 282).

The mechanisms of the present invention allow for the backup of information, for example, in an aggregate backup scenario with the information gleaned from a variety of inputs/locations. For example, in an exemplary aggregate backup, the backup information may be taken from the most current location for each dataset. Accordingly, the locations/inputs may include a direct access storage device (DASD), a dump tape, a dump site, and even an application. Such capabilities may be used in a restore scenario (where backup datasets are used in the case of an unavailability or corruption of the primary version datasets). The most current version of the data may be used in a restore operation. Such an enhanced restore operation may allow for using datasets from numerous backup groups for a single restore job.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for performing a backup operation in a computing environment, comprising:
    determining if each portion of a dataset corresponding to a backup copy has changed since a previous backup operation,
        wherein if a first portion of the dataset has not changed:
            consulting a backup inventory registry to determine a current version of the backup copy for the first portion, the current version one of a plurality of available versions; and
            performing the backup operation of the first portion using the current version of the backup copy for the first portion; and wherein if a second portion of the dataset has changed:
performing the backup operation of the second portion using an original version of the dataset for each subsequent change to the second portion; and
merging a backup of the first portion and a backup of the second portion to a same storage media.

2. The method of claim 1, wherein consulting a backup inventory registry to determine a current version of a backup copy includes determining at least one of a most current location, a most current date, and a most current time the backup copy was made, the current version having at least one of the most current location, the most current date, and the most current time.

3. The method of claim 1, further including, subsequent to the previous backup operation, recording a location of the backup copy in the backup inventory registry.

4. The method of claim 3, wherein recording the current location of the backup copy in the backup inventory registry includes recording a date and time the backup copy is made.

5. The method of claim 1, wherein performing the backup operation using the current version of the backup copy includes using the current version of the backup copy from at least one of a direct access storage device (DASD), a dump tape, a dump site, and an application.

6. The method of claim 1, further including, if the dataset corresponding to the backup copy has changed:
obtaining the dataset from a primary volume to perform the backup operation for the dataset.

7. The method of claim 1, wherein determining if a dataset corresponding to the backup copy has changed since a previous backup operation includes consulting a dataset changed indicator on a volume table of contents (VTOC) to determine if the dataset changed indicator is active.

8. A system for performing a backup operation in a computing environment, comprising:
a processor; and
memory coupled to the processor, the memory storing a backup module operable on the computing environment, the backup module adapted for:
determining if each portion of a dataset corresponding to a backup copy has changed since a previous backup operation,
wherein if a first portion of the dataset has not changed, the backup module is further adapted for:
consulting a backup inventory registry to determine a current version of a backup copy for the first portion, the current version one of a plurality of available versions,
performing the backup operation of the first portion using the current version of the backup copy for the first portion, and
wherein if a second portion of the dataset has changed, the backup module is further adapted for:
performing the backup operation of the second portion using an original version of the dataset for each subsequent change to the second portion; and
merging a backup of the first portion and a backup of the second portion to a same storage media.

9. The system of claim 8, wherein the backup module is further adapted for determining at least one of a most current location, a most current date, and a most current time the backup copy was made, the current version having at least one of the most current location, the most current date, and the most current time.

10. The system of claim 8, wherein the backup module is further adapted for, subsequent to the previous backup operation, recording the current location of the backup copy in the backup inventory registry.

11. The system of claim 9, wherein the backup module is further adapted for recording a date and time the backup copy is made.

12. The system of claim 8, wherein the backup module is further adapted for using the current version of the backup copy from at least one of a direct access storage device (DASD), a dump tape, a dump site, and an application.

13. The system of claim 8, wherein if the dataset has changed, the backup module is further adapted for obtaining the dataset from a primary volume to perform the backup operation for the dataset.

14. The system of claim 13, wherein the backup module is further adapted for consulting a dataset changed indicator on a volume table of contents (VTOC) to determine if the dataset changed indicator is active.

15. A computer program product for performing a backup operation in a computing environment, the computer program product comprising a computer-readable memory device including computer-readable program code portions stored therein, the computer-readable program code portions comprising:
a first executable portion for determining if each portion of a dataset corresponding to a backup copy has changed since a previous backup operation,
wherein if a first portion of the dataset has not changed:
consulting a backup inventory registry to determine a current version of a backup copy for the first portion, the current version one of a plurality of available versions,
performing the backup operation for the first portion using the backup copy from the current location, and
wherein if a second portion of the dataset has changed:
performing the backup operation using an original version of the dataset for each subsequent change to the second portion; and
a second executable portion for merging a backup of the first portion and a backup of the second portion to a same storage media.

16. The computer program product of claim 15, wherein the first executable portion for consulting a backup inventory registry to determine a current version of a backup copy includes a third executable portion for determining at least one of a most current location, a most current date, and a most current time the backup copy was made, the current version having at least one of the most current location, the most current date, and the most current time.

17. The computer program product of claim 15, further including a third executable portion for, subsequent to the previous backup operation, recording a current location of the backup copy in the backup inventory registry.

18. The computer program product of claim 16, wherein the third executable portion for recording the current location of the backup copy in the backup inventory registry includes a fourth executable portion for recording a date and time the backup copy is made.

19. The computer program product of claim 15, wherein the first executable portion for performing the backup operation using the current version of the backup copy includes a third executable portion for using the current version of the backup copy from at least one of a direct access storage device (DASD), a dump tape, a dump site, and an application.

20. The computer program product of claim 15, wherein the first executable portion for performing the backup operation using the current version of the backup copy includes a third executable portion for, if the dataset has changed, obtaining the dataset from a primary volume to perform the backup operation for the dataset.

* * * * *